United States Patent
Hosoda et al.

(10) Patent No.: US 6,841,218 B2
(45) Date of Patent: Jan. 11, 2005

(54) WRITE ONCE OPTICAL RECORDING MEDIUM

(75) Inventors: Yasuo Hosoda, Tsurugashima (JP); Satoshi Jinno, Tsurugashima (JP); Ayumi Mitsumori, Tsurugashima (JP); Hideo Kudo, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 78 days.

(21) Appl. No.: 10/436,368

(22) Filed: May 13, 2003

(65) Prior Publication Data

US 2003/0228539 A1 Dec. 11, 2003

(30) Foreign Application Priority Data

May 15, 2002 (JP) ...................................... 2002-140090

(51) Int. Cl.$^7$ ................................................. B32B 3/02
(52) U.S. Cl. ..................... 428/64.1; 428/64.4; 428/64.5; 430/270.13
(58) Field of Search ............................... 428/64.1, 64.4, 428/64.5, 64.6, 913; 430/270.13, 945

(56) References Cited

U.S. PATENT DOCUMENTS

| | | | | |
|---|---|---|---|---|
| 5,981,014 A | * | 11/1999 | Tsukagoshi et al. | 428/64.1 |
| 6,033,752 A | * | 3/2000 | Suzuki et al. | 428/64.1 |
| 6,153,355 A | * | 11/2000 | Takahashi et al. | 430/270.13 |
| 6,242,157 B1 | * | 6/2001 | Tominaga et al. | 430/270.13 |
| 6,406,772 B2 | * | 6/2002 | Tominaga et al. | 428/64.1 |
| 6,544,617 B1 | * | 4/2003 | Tyan et al. | 428/64.1 |
| 6,605,330 B2 | * | 8/2003 | Tyan et al. | 428/64.1 |

* cited by examiner

Primary Examiner—Elizabeth Mulvaney
(74) Attorney, Agent, or Firm—Morgan, Lewis & Bockius LLP

(57) ABSTRACT

An object of the present invention is to provide a phase-change optical recording medium of an amorphous recording mark type. The optical recording medium is a write once type medium capable of decreasing the degradation of an information signal which has been already recorded. The recording layer of the optical recording medium according to the present invention includes a first recording layer and a second recording layer. The first recording layer comprises a first composition which can be changed into another composition more stable in an amorphous state by combining with a component included in the second recording layer.

31 Claims, 4 Drawing Sheets

WRITE ONCE OPTICAL RECORDING MEDIUM

BACKGROUND OF THE INVENTION

1) Field of the Invention

The present invention relates to a write once optical recording medium using a phase-change in a recording layer.

2) Description of the Related Art

A phase-change type optical recording medium is well known. In such recording medium, information can be recorded and reproduced by changing a phase in a recording layer of the recording medium. The phase change is between a crystalline state and an amorphous state (non-crystalline state) which have a refractive index different from each other. In a conventional manufacturing process of the phase-change type optical recording medium, the recording layer is deposited on a substrate by means of a thin film process under a vacuum such as a vacuum deposition method, an ion-plating method and a sputtering method. The recording layer on the substrate after the deposition process has an amorphous state. Then, a beam of a laser, halogen lamp or the like is irradiated on the substrate so that an optical recording medium having the recording layer in a crystalline state is provided. (The aforementioned process to crystallize the recording layer from the amorphous state into the crystalline state is hereinafter called an "initialization step".)

In order to record an information signal to such optical recording medium the recording layer in a crystalline state is irradiated with a laser beam so that the phase in the recording layer is changed from the crystalline state into the amorphous state. Thus, the signal can be recorded by a recording mark which is formed as above.

With respect to the manufacturing process of a write once optical recording medium, which is capable to record the information only once, it is preferable that the phase of the recording layer can be easily changed from the amorphous state into the crystalline state during formation of the crystalline state of the recording layer which is the state before recording the information signal. To the contrary, it is preferable that the phase of the recording layer cannot be easily changed again from the amorphous state into the crystalline state in order to prevent a degradation of the information signal after recording the information. Thus, it is preferable that the recording layer before recording the information signal has stability in the crystalline state whereas the recording layer after recording the information signal has stability in the amorphous state.

Japanese Patent Kokai No. 11-73692 discloses a method for manufacturing a write once optical recording medium. The recording layer in the optical recording medium is directly deposited in a crystalline state, not an amorphous state, on the substrate during the step of forming the recording layer on the substrate. Thus, the initialization step can be omitted. This recording layer has a multi-layer structure comprising a first recording layer consisting of a Te-series material and a second recording layer consisting of a (Ge, Sb)-series material. In recording the information signal, a power source for optical recording applies power to the recording layer, so as to melt and mix the first recording layer and the second recording layer. When the optical recording power is stopped, these layers are cooled down rapidly and solidify in the amorphous state. Specifically, the phase of the recording layer is changed from the crystalline state into the amorphous state by an on-off operation of the optical recording power. Thereby the information signal is recorded. In the manufacturing process for such a write once optical recording medium, it is necessary to purify Te in the materials since the first recording layer made of Te series material is deposited in the crystalline state on the substrate without undergoing the amorphous state. The first recording layer is particularly vulnerable to oxidization and is difficult to handle.

A method to record the information by forming a crystalline recording mark is also known. The recording layer in the amorphous state is irradiated by a laser light to change the state of the phase. Thereby the information signal is recorded. However this method is not preferable for the write once optical recording medium because of the difficulty in edge control between a signal recording area and a matrix which tends to cause increased jitter.

SUMMARY OF THE INVENTION

An object of the present invention is to provide a phase-change optical recording medium of an amorphous recording mark type which records the information by changing a phase of a recording layer from a crystalline state into an amorphous state (non-crystalline state). The optical recording medium is a "write once type" medium capable of decreasing a degradation of an information signal which has already been recorded.

An optical recording medium according to the present invention comprises a substrate, and a recording layer for recording an information signal by changing a phase of the recording layer from a crystalline state into an amorphous state. The recording layer has a first recording layer and a second recording layer. The first recording layer comprises a first composition which can be changed into another composition more stable in an amorphous state by combining with a component included in the second recording layer. That is, the first composition can be changed into another composition having a higher crystallized energy. Preferably, the second recording layer comprises a second composition which can be changed into another composition having a higher crystallized energy by combining with a component included in the first recording layer.

A recording light for recording the information signal is irradiated to a region of the recording layer in a crystalline state and then the region is heated and melted. At least a part of the components in the second recording layer diffuses into the first recording layer so that the first composition can be changed into another composition having a higher crystallized energy by combining with a component included in the second recording layer. After the irradiation step, the irradiation of the recording light is shut out, and then the irradiated region is cooled down so that the phase of the irradiated region is changed from a crystalline state into an amorphous state.

DETAILED DESCRIPTION OF THE INVENTION

Embodiments of the optical recording medium according to the present invention will be described hereinafter in detail with reference to the drawings.

Figure 1:
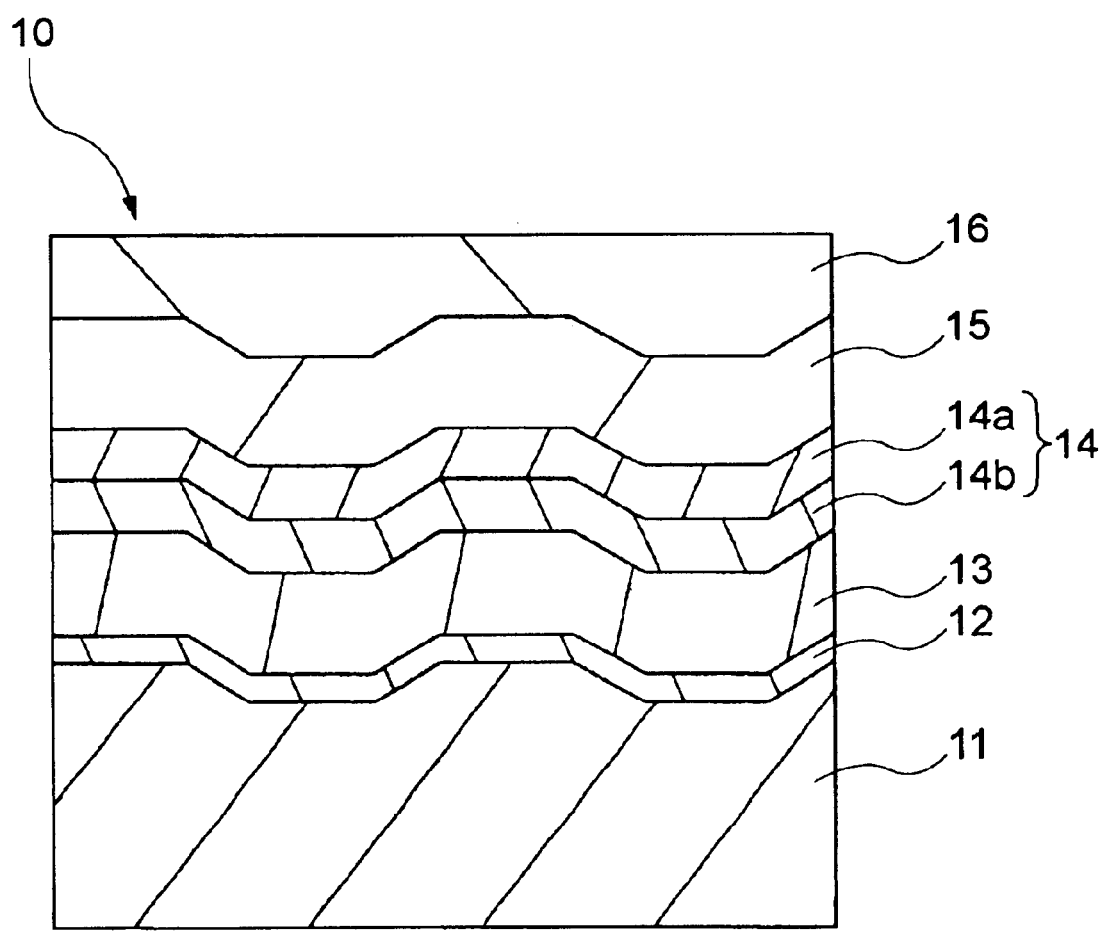
FIG. 1 shows a fragmentary expanded sectional view of the optical recording medium according to one embodiment of the present invention.

As shown in FIG. 1, an optical recording medium 10 according to the present invention has a structure comprising a reflective layer 12, a second dielectric layer 13, a recording layer 14, a first dielectric layer 15 and a protective layer 16 which are formed on a substrate 11 in the described order. The recording layer 14 comprises a first recording layer 14a and a second recording layer 14b. Detailed materials regarding the first recording layer 14a, the second recording layer 14b and so on will be described later.

Figure 2:
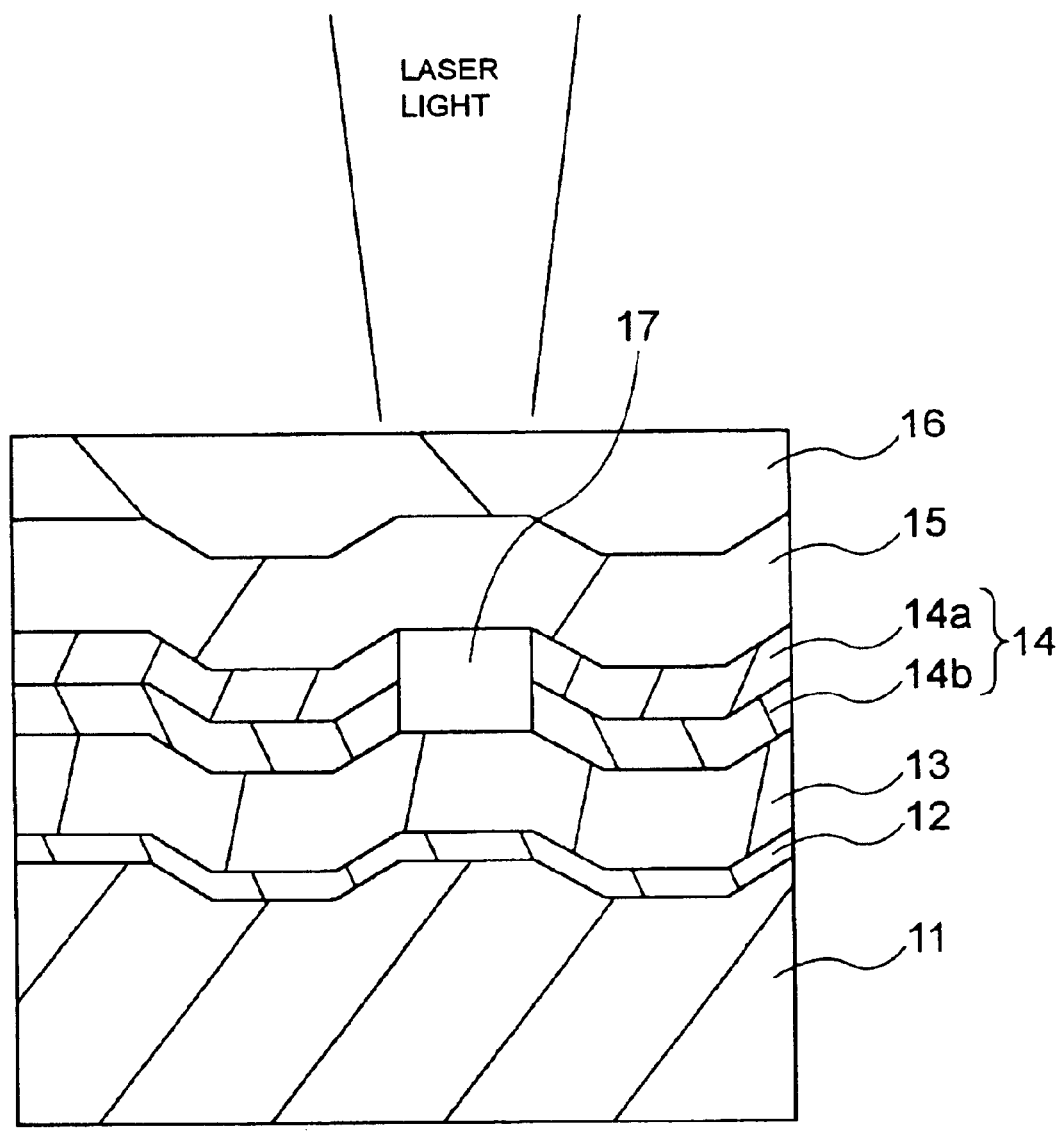
FIG. 2 shows a fragmentary expanded sectional view of the optical recording medium according to one embodiment of the present invention.

The phase-change type optical recording medium 10 according to the present invention is an amorphous recording mark type medium. The first recording layer 14a and the second recording layer 14b are deposited in the amorphous state. Then these layers are adjusted into the crystalline state by the initialization step. Thereafter the medium is used for recording the information signal. As can be seen in FIG. 2, in recording the information signal, a laser light is directed toward the side of the optical recording layer 10 facing the protective layer 16. The laser light reaches the recording layer 14 after passing through the first dielectric layer 15. A region of the recording layer 14, upon receiving the laser light irradiation, absorbs the laser light, generates heat, and then melts, which are procedures similar to the conventional recording layer of phase-change type optical recording medium. In a molten region 17 of the recording layer 14, a mutual atomic diffusion occurs between the first recording layer 14a and the second recording layer 14b.

Upon stopping the laser light irradiation, the molten region 17 of the recording layer 14 is cooled down rapidly, which in turn solidifies the region while keeping its amorphous state. Specifically, the molten region 17 of the recording layer 14 changes its phase from the crystalline state to the amorphous state by the laser light irradiation. Because the phase-change mentioned above shifts the optical refractivity, the information signal can be recorded.

A pair of materials used for the first recording layer 14a and the second recording layer 14b is selected such that the mutual atomic diffusion between the first recording layer 14a and the second recording layer 14b, which occurs during the melting of the recording layer 14 by the laser light irradiation, yields a slower crystallization rate as compared with the rate before the diffusion. Specifically, materials to be selected are those which exhibit stability in the amorphous state when compositions of the materials are changed. Example of the pair of materials are shown below. It is to be understood that the examples do not limit the present invention and any materials satisfying the above criteria may be used:

(a) An elemental substance of Sb70Te30, or a material thereof with an additive such as Ag, Ge, In and Sb.

(b) An elemental substance such as GeTe or Sb2Te3, a mixture thereof, or a mixture thereof with an additive such as Sb, Te and Sn.

With respect to the material property of (a), increasing the amount of Ge or Te generally slows down the crystallization rate, that is, the amorphous state exhibits higher stability. Whereas, with respect to the material property of (b), increasing the amount of Sb due to a compositional deviation from the stoichiometric amount of Sb2Te3+GeTe slows down the crystallization rate. Specifically, melting of materials (a) and (b) allows diffusion of Ge and Te from (b) to (a) as diffusion of Sb from (a) to (b), which in turn stabilizes both materials (a) and (b) in the amorphous state as compared with a state before the diffusion. In other words, the atomic diffusion changes the layers into the compositions which require a large amount of energy in changing the phase from the amorphous state into the crystalline state. It is preferable that material (a) in the amorphous state just after the film deposition exhibits a higher crystallizing rate, that is, the material in the crystalline state exhibits stability. In general, it is preferable that (a) is comprised of an eutectic compound having an eutectic composition or a solid solution having a composition close to that of the eutectic compound. Whereas, it is preferable that (b) has a composition close to the stoichiometric amount of Sb2Te3+GeTe.

Materials used for the substrate 11, the reflective layer 12, the second dielectric layer 13, the first dielectric layer 15 and the protective layer 16 can be selected from any known materials used for conventional optical recording mediums.

For example, materials used for the substrate 11 and the protective layer 16 are preferably selected from glass or plastic resin, such as polycarbonate, which are transparent materials with respect to a wavelength of a light source used for recording the information signal. As an alternative, these layers may be fabricated by binding a plurality of such plastic resins. As a further alternative, these layers may be fabricated by applying an ultraviolet curable resin or the like using a coating method such as spin coating, followed by the resin curing.

For the second dielectric layer 13 and the first dielectric layer 15, which are provided as protective layers for the prevention of oxidation of the recording layer 14 and the prevention of a thermal deformation of the substrate 11, preferable materials are normally selected from ZnS, SiO2, ZnS—SiO2 and the like. Alternatively, such materials may be selected from metal compounds such as a metal nitride, a metal oxide, a metal carbide, a metal sulfide, a metal selenide and the like or a mixture thereof, wherein metals such as Si, Ge, Al, Ti, Zr, Ta, Ce and the like are used. These layers may be comprised of either a single layer or multi-layers.

Materials used for the reflective layer 12 are preferably selected from materials having a higher refractivity with respect to the wavelength of the light source used for recording information. Such materials may be normally selected from a metallic film using metals such as Al, Au, Ag, Cu and Cr, an alloy thereof, or a mixture thereof.

The degradation characteristic with respect to the information signal after the overwrite-recording was measured for a write once phase-change optical recording medium manufactured by a conventional method as a comparative example.

Figure 3:
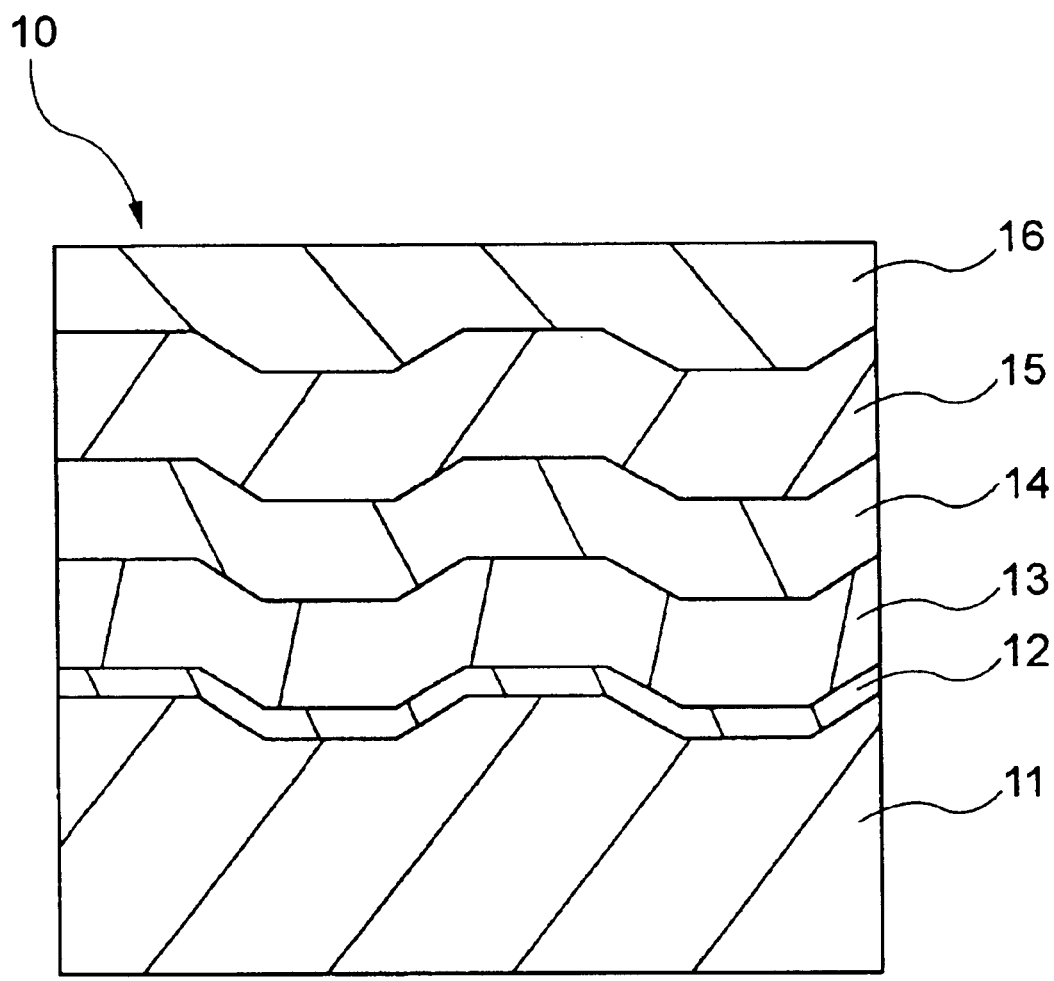
FIG. 3 shows a fragmentary expanded sectional view of the optical recording medium as a comparative example.

Reference is made to FIG. 3 which illustrates the substrate 11 as a disc made of polycarbonate resin having a thickness of 1.1 mm and a diameter of 120 mm with a spiral groove formed on a surface of the disc having a pitch of 0.315 μm. Formed on the substrate 11 in the following order is a reflective layer 12 made of Ag—Pd—Cu alloy having a thickness of 100 nm, a second dielectric layer 13 made of ZnS—SiO2 having a thickness of 8 nm, a recording layer 14 made of Ge—In—Sb—Te having a thickness of 14 nm and a first dielectric layer 15 made of ZnS—SiO2 having a thickness of 35 nm. The layers were formed by a sputtering method. Furthermore, a resin make provide sheet made of polycarbonate was attached over the layer using an ultraviolet curable resin as an adhesive therebetween so as to make an overall thickness of 0.1 mm. The recording layer 14 was then crystallized by irradiating a semiconductor laser having a wavelength of 810 nm (initializing step).

Formation of a signal pattern was carried out on the conventional phase-change type optical recording medium of the amorphous marking type by placing the optical recording medium on a driving apparatus used for evaluating the optical disc, whereon the medium is rotated at a linear velocity of 10 m/s and irradiated by a laser light having a wavelength of 405 nm directed toward the side of the medium facing the protective layer 16 after passing through an optical system having a numerical aperture of 0.85. In recording the signal, a multipath was used with a recording power of 5.0 mW and a window width of 15.13 nsec. Accordingly, a random pattern having 1–7 modulations was recorded.

After a first recording, good results of about 10% jitter was measured. The jitter measured after a second overwrite-recording was about 10%, and after the one hundredth repetitive overwrite-recording the jitter was increased to about 11%. Thus, it was determined that the write once optical recording medium with such a jitter level is inappropriate because the medium has a probability that the recording data may be altered by the overwrite-recording.

The degradation characteristic with respect to the information signal after the overwrite-recording was measured for an optical recording medium according to the embodiment of the present invention.

Description will be made below by referring back to FIG. 1. Ge—In—Sb—Te material having a composition of (Sb70Te30)+Ge+In+Sb and GeTe material were selected for the pair of materials used for the first recording layer 14a and the second recording layer 14b, respectively. Alternatively, GeTe and Ge—In—Sb—Te alloy may be selected for the first recording layer 14a and the second recording layer 14b, respectively. A substrate 11 is a polycarbonate resin disc having a thickness of 1.1 mm and a diameter of 120 mm, and a spiral groove is formed on a surface of the disc with a pitch of 0.320 μm. On the substrate 11, the following layers were formed in the given order by sputtering; a reflective layer 12 made of Ag—Pd—Cu alloy having a thickness of 100 nm, a second dielectric layer 13 made of ZnS—SiO2 having a thickness of 6 nm, a second recording layer 14b made of GeTe having a thickness of 6 nm, a first recording layer 14a made of Ge—In—Sb—Te having a thickness of 8 nm and a first dielectric layer 15 made of ZnS—SiO2 having a thickness of 40 nm.

Furthermore, a polycarbonate resin sheet was attached over the layer using an ultraviolet curable resin as an adhesive therebetween so as to make an overall thickness at 0.1 mm. At this moment just after the aforementioned processes, both materials of the first recording layer 14a and the second recording layer 14b were in the amorphous state. The first recording layer 14a and the second recording layer 14b were then processed by the initialization step. The layers were crystallized by irradiating a semiconductor laser having a wavelength of 810 nm. Accordingly, fabrication of the phase-change type optical recording medium of the amorphous marking type was accomplished. The medium, namely, the first recording layer 14a and the second recording layer 14b were in the crystalline state before recording the information signal.

The degradation characteristic with respect to the information signal after the overwrite-recording was measured by recording the information signal on the optical recording medium according to the first embodiment. The conditions of the evaluation were the same as that used for the aforementioned comparative example. To be specific, formation of a signal pattern was carried out on the optical recording medium by placing the medium on the driving apparatus used for evaluating the optical disc, whereon the medium is rotated at a linear velocity of 10 m/s and irradiated by the laser light having a wavelength of 405 nm which is directed toward the side of the medium facing the protective layer 16 after passing through the optical system having a numerical aperture of 0.85. In recording the signal, the multipath was used with a recording power of 5.0 mW and a window width of 15.13 nsec. Accordingly, a random pattern having 1–7 modulations was recorded.

After a first recording, good results of about 10% jitter was measured. The jitter measured after a second overwrite-recording was low and out of the measurable range. After the first recording, the medium was exposed to an erasing process, then re-recording was carried out on the medium. The jitter measured after the re-recording was also out of the measurable range. It was therefore confirmed that this medium was preferable for the write once type optical recording medium.

Ge—In—Sb—Te material having a composition of (Sb70Te30)+Ge+In+Sb and Sb—Te material having a composition of Sb2Te3 were selected for the pair of materials used for the first recording layer 14a and the second recording layer 14b, respectively. A substrate 11 is a polycarbonate resin disc having a thickness of 1.1 mm and a diameter of 120 mm, and a spiral groove is formed on a surface of the disc with a pitch of 0.315 μm. The following layers were formed in the given order by sputtering on the substrate 11; a reflective layer 12 made of Ag—Pd—Cu alloy having a thickness of 100 nm, a second dielectric layer 13 made of ZnS—SiO2 having a thickness of 6 nm, a second recording layer 14b made of Sb—Te having a thickness of 12 nm, a first recording layer 14a made of Ge—In—Sb—Te having a thickness of 8 nm and a first dielectric layer 15 made of ZnS—SiO2 having a thickness of 40 nm. Furthermore, a polycarbonate resin sheet was attached over the layer using an ultraviolet curable resin as an adhesive therebetween so as to make an overall thickness at 0.1 mm. The first recording layer 14a and the second recording layer 14b were then processed by the initialization step, wherein the layers were crystallized by irradiating a semiconductor laser having a wavelength of 810 nm.

The degradation characteristic with respect to the information signal after the overwrite-recording was measured by recording the information signal on the optical recording medium according to the second embodiment. The conditions of the evaluation were almost the same as that used for the first embodiment except that a recording power of 3.0 mW was applied. After a first recording, good results of about 12% jitter was measured. The jitter measured after a second overwrite-recording was low and out of the measurable range. After the first recording, the medium was exposed to an erasing process, then re-recording was carried out on the medium. The jitter measured after such re-recording was also out of the measurable range. It was therefore confirmed that the medium was preferable for the write once type optical recording medium.

Figure 4:
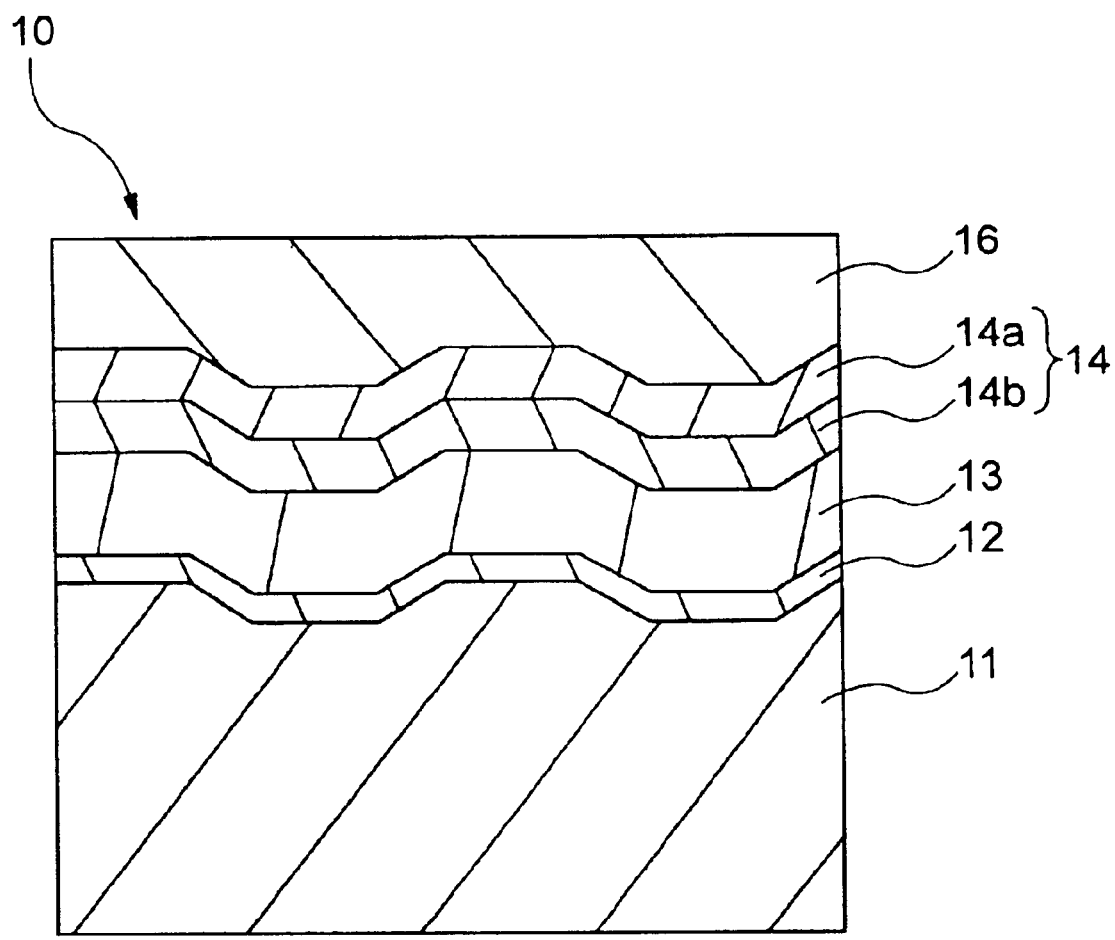
FIG. 4 shows a fragmentary expanded sectional view of the optical recording medium according to another embodiment of the present invention.

Description will be made below by referring to FIG. 4. A Ge—In—Sb—Te compound having a composition of (Sb70Te30)+Ge+In+Sb and a Sb—Te compound having a composition of Sb2Te3 are selected as materials of the first recording layer 14a and the second recording layer 14b, respectively. A substrate 11 is a polycarbonate resin disc having a thickness of 1.1 mm and a diameter of 120 mm with a spiral groove formed on a surface of the disc having a pitch of 0.315 µm. The following layers were formed in the given order by sputtering on the substrate 11; a reflective layer 12 made of Ag—Pd—Cu alloy having a thickness of 15 nm, a second dielectric layer 13 made of ZnS—SiO2 having a thickness of 7 nm, a second recording layer 14b made of Sb—Te having a thickness of 2 nm, and a first recording layer 14a made of Ge—In—Sb—Te having a thickness of 4 nm. In this embodiment, the first dielectric layer was not formed. Also, a polycarbonate resin sheet was attached over the layer using an ultraviolet curable resin as an adhesive therebetween so as to make an overall thickness at 0.1 mm. The first recording layer 14a and the second recording layer 14b were then processed by the initialization step. In the initialization step the layers were crystallized by irradiating a semiconductor laser having a wavelength of 810 nm.

The degradation characteristic with respect to the information signal after the overwrite-recording was measured by recording the information signal on the optical recording medium according to the third embodiment. The conditions of the evaluation were almost the same as the conditions used for the first embodiment except for using a recording power of 5.5 mW. After a first recording, good results of about 12% jitter was measured. The jitter measured after a second overwrite-recording was low and out of the measurable range. After the first recording, the medium was exposed to an erasing process, then re-recording was carried out on the medium. The jitter measured after such re-recording was also out of the measurable range. It was therefore confirmed that the medium was preferable for the write once optical recording medium.

According to the present invention, the recording layer after recording the information signal is changed into the amorphous state having a higher stability as compared with the recording layer after the deposition step. Thus, the recording layer is prohibited from returning to a re-writable state or an overwritable state by erasing the recording mark.

This application is based on a Japanese patent application No. 2002-140090 which is incorporated herein by reference.

What is claimed is:

1. An optical recording medium, comprising:
   a substrate; and
   a recording layer for recording an information signal by changing a phase of said recording layer from a crystalline state to an amorphous state;
   wherein said recording layer includes a first recording layer and a second recording layer, and said first recording layer comprises a first composition which can be changed into another composition more stable in an amorphous state by combining with a component included in said second recording layer.

2. The optical recording medium according to claim 1, wherein said second recording layer comprises of a second composition which can be changed into another composition more stable in an amorphous state by combining with a component included in said first recording layer.

3. The optical recording medium according to claim 1, wherein said first composition is an eutectic compound of Sb—Te in a crystalline state.

4. The optical recording medium according to claim 3, wherein said second composition includes at least one of Ge and Te.

5. The optical recording medium according to claim 3, wherein said first composition further includes at least one element selected from a group comprising Ag, Ge, In and Sb.

6. The optical recording medium according to claim 5, wherein said second composition includes at least one of Ge and Te.

7. The optical recording medium according to claim 1, wherein said first composition is a solid solution of Sb—Te in a crystalline state such that increasing the amount of Ge or Te slows down the crystallization rate.

8. The optical recording medium according to claim 7, wherein said second composition includes at least one of Ge and Te.

9. The optical recording medium according to claim 7, wherein said first composition further includes at least one element selected from a group comprising Ag, Ge, In and Sb.

10. The optical recording medium according to claim 9, wherein said second composition includes at least one of Ge and Te.

11. The optical recording medium according to claim 1, wherein said first composition is a GeTe compound such that adding Sb slows down the crystallization rate.

12. The optical recording medium according to claim 11, wherein said second composition includes Sb.

13. The optical recording medium according to claim 11, wherein said first composition further includes at least one element selected from a group comprising Sb, Te and Sn.

14. The optical recording medium according to claim 13, wherein said second composition includes Sb.

15. The optical recording medium according to claim 1, wherein said first composition includes a Sb2Te3 compound such that increasing the amount of Sb slows down the crystallization rate.

16. The optical recording medium according to claim 15, wherein said second composition includes Sb.

17. The optical recording medium according to claim 15, wherein said first composition further includes at least one element selected from a group comprising Sb, Te and Sn.

18. The optical recording medium according to claim 17, wherein said second composition includes Sb.

19. The optical recording medium according to claim 1, wherein said first composition comprises of a Sb2Te3-GeTe mixture such that increasing the amount of Sb slows down the crystallization rate.

20. The optical recording medium according to claim 19, wherein said second composition includes Sb.

21. The optical recording medium according to claim 19, wherein said first composition further includes at least one element selected from a group comprising Sb, Te and Sn.

22. The optical recording medium according to claim 21, wherein said second composition includes Sb.

23. The optical recording medium according to claim 2, wherein said first composition is a Sb—Te eutectic composition in a crystalline state, and said second composition is a GeTe compound such that increasing the amount of Sb slows down the crystallization rate.

24. The optical recording medium according to claim 23, wherein said first composition further includes at least one element selected from a group comprising Ag, Ge, In and Sb.

25. The optical recording medium according to claim 23, wherein said second composition further includes at least one element selected from a group comprising Sb, Te and Sn.

26. The optical recording medium according to claim 2, wherein said first composition is a Sb—Te eutectic compound in a crystalline state, and said second composition is a Sb2Te3-GeTe compound such that increasing the amount of Sb slows down the crystallization rate.

27. The optical recording medium according to claim 26, wherein said first composition further includes at least one element selected from a group comprising Ag, Ge, In and Sb.

28. The optical recording medium according to claim 26, wherein said second composition further includes at least one element selected from a group comprising Sb, Te and Sn.

29. The optical recording medium according to claim 2, wherein said first composition is a Sb—Te eutectic compound in a crystalline state, and said second composition comprises a Sb2Te3-GeTe mixture such that increasing the amount of Sb slows down the crystallization rate.

30. The optical recording medium according to claim 29, wherein said first composition further includes at least one element selected from a group comprising Ag, Ge, In and Sb.

31. The optical recording medium according to claim 29, wherein said second composition further includes at least one element selected from a group comprising Sb, Te and Sn.

* * * * *